United States Patent [19]

Jensen et al.

[11] Patent Number: 5,359,654
[45] Date of Patent: Oct. 25, 1994

[54] TELECOMMUNICATIONS NETWORK INTERFACE ASSEMBLY

[75] Inventors: Michael L. Jensen, Cary; Thomas M. Baum, Apex; John E. Francis, Raleigh; John C. Mason, Cary; Jack A. Smith, Jr., Garner, all of N.C.

[73] Assignee: Raychem Corporation, Menlo Park, Calif.

[21] Appl. No.: 881,958

[22] Filed: May 12, 1992

[51] Int. Cl.⁵ ............................................. H04M 1/00
[52] U.S. Cl. .................................... 379/397; 379/399; 379/412; 379/387; 379/419; 439/426; 439/185; 439/271
[58] Field of Search ............... 379/399, 412, 387, 419; 439/426, 185, 271

[56] References Cited

U.S. PATENT DOCUMENTS

| | | | |
|---|---|---|---|
| D. 275,667 | 9/1984 | Dellinger et al. | D13/30 |
| D. 282,654 | 2/1986 | Perry et al. | D13/41 |
| D. 297,136 | 8/1988 | Collins et al. | D13/40 |
| D. 300,923 | 5/1989 | Collins et al. | D13/31 |
| D. 312,244 | 11/1990 | Collins et al. | D13/152 |
| D. 312,820 | 12/1990 | Collins et al. | D14/240 |
| D. 313,417 | 1/1991 | Graham et al. | D14/240 |
| D. 314,385 | 2/1991 | Karan et al. | D14/140 |
| D. 314,759 | 2/1991 | Collins et al. | D13/184 |
| D. 318,653 | 7/1991 | Nieves et al. | D13/184 |
| 4,159,159 | 6/1979 | Kaucic et al. | |
| 4,373,120 | 2/1983 | McDonald | 179/175 |
| 4,408,248 | 10/1983 | Bulley et al. | 361/91 |
| 4,473,265 | 9/1984 | Dellinger et al. | 339/39 |
| 4,488,008 | 12/1984 | Dellinger et al. | 179/81 R |
| 4,500,158 | 2/1985 | Dola | 339/122 R |
| 4,536,617 | 8/1985 | Perry | 179/81 R |
| 4,550,225 | 10/1985 | Lynch et al. | 179/81 R |
| 4,558,182 | 12/1985 | Perry et al. | 179/81 R |
| 4,562,311 | 12/1985 | Dola | 179/158 R |
| 4,575,169 | 3/1986 | Duplatre et al. | 339/44 M |
| 4,582,960 | 4/1986 | DeLuca et al. | 179/98 |
| 4,588,238 | 5/1986 | Mickelson et al. | 339/91 R |
| 4,616,897 | 10/1986 | Dola | 339/122 R |
| 4,647,725 | 3/1987 | Dellinger et al. | 329/29 |
| 4,658,422 | 4/1987 | Sparks | 379/442 |
| 4,666,225 | 5/1987 | Hampton et al. | 339/42 |
| 4,679,224 | 7/1987 | Lynch et al. | 379/26 |
| 4,682,347 | 7/1987 | Lynch | 379/29 |
| 4,686,696 | 8/1987 | Lynch | 379/22 |
| 4,686,700 | 8/1987 | Perry | 379/183 |
| 4,701,949 | 10/1987 | Lynch et al. | 379/179 |
| 4,723,919 | 2/1988 | Crane | 439/521 |
| 4,729,059 | 3/1988 | Wang | 361/356 |
| 4,741,032 | 4/1988 | Hampton | 379/399 |
| 4,742,541 | 5/1988 | Cwirzen et al. | 379/412 |
| 4,748,651 | 5/1988 | Collins et al. | 379/22 |

(List continued on next page.)

FOREIGN PATENT DOCUMENTS

0426384 5/1991 European Pat. Off. .
WO9204794 3/1992 World Int. Prop. O. .
WO9307654 4/1993 World Int. Prop. O. .

Primary Examiner—James L. Dwyer
Assistant Examiner—J. M. Saint-Surin
Attorney, Agent, or Firm—Herbert G. Burkard; William D. Zahrt, II; A. Stephen Zavell

[57] ABSTRACT

Modules integral with the body of the assembly include one for drop wire connections, one for subscriber wire connections, one for an electronics interface, and one for a network interface device. Protective sealant material within the assembly protects contacts from corrosion and other deterioration, and from shorting. Sealant plungers and a chamber containing a compressed gas impose compressive forces upon the sealant material. Shunt plugs associated with two of the modules permit signal transmission across the modules at desired times, and when removed eliminate the possibility of a subscriber being shocked or transmitting a spark when accessing subscriber components of the assembly. The main body and the modules of the assembly preferably are integrally connected and form a unitary sealed assembly.

74 Claims, 8 Drawing Sheets

U.S. PATENT DOCUMENTS

| | | | |
|---|---|---|---|
| 4,749,359 | 6/1988 | White | 439/133 |
| 4,761,810 | 8/1988 | Perry | 379/181 |
| 4,785,381 | 11/1988 | Collins et al. | 361/417 |
| 4,788,710 | 11/1988 | Lynch | 379/29 |
| 4,789,348 | 12/1988 | Hampton | 439/142 |
| 4,796,290 | 1/1989 | Perry | 379/27 |
| 4,800,588 | 1/1989 | Poster, Jr. | 379/412 |
| 4,807,277 | 2/1989 | Perry | 379/102 |
| 4,809,323 | 2/1989 | Collins et al. | 379/399 |
| 4,825,466 | 4/1989 | Dowler et al. | 379/445 |
| 4,827,504 | 5/1989 | Collins et al. | 379/399 |
| 4,846,721 | 7/1989 | Debruycker et al. | |
| 4,853,960 | 8/1989 | Smith | 379/437 |
| 4,860,350 | 8/1989 | Smith | 379/412 |
| 4,863,393 | 9/1989 | Ward et al. | 439/188 |
| 4,863,398 | 9/1989 | Steenton et al. | 439/538 |
| 4,864,598 | 9/1989 | Lynch et al. | 379/6 |
| 4,882,647 | 11/1989 | Collins | 361/119 |
| 4,910,770 | 3/1990 | Collins et al. | 379/399 |
| 4,919,544 | 4/1990 | Graham | 379/399 |
| 4,932,051 | 6/1990 | Karan et al. | 379/399 |
| 4,937,851 | 6/1990 | Lynch et al. | 379/6 |
| 4,945,559 | 7/1990 | Collins et al. | 379/399 |
| 4,945,560 | 7/1990 | Collins et al. | 379/399 |
| 4,949,376 | 8/1990 | Nieves et al. | 379/399 |
| 4,979,209 | 12/1990 | Collins et al. | 379/399 |
| 5,086,459 | 2/1992 | Perry | 379/200 |
| 5,109,467 | 4/1992 | Hogan et al. | 385/135 |

TELECOMMUNICATIONS NETWORK INTERFACE ASSEMBLY

CROSS-REFERENCE TO RELATED APPLICATIONS

Commonly assigned U.S. patent application Ser. Nos. 07/776,501, and 07/584,325, disclose some matter also disclosed in the present application.

FIELD OF THE INVENTION

This invention relates to telephone interface assemblies that interconnect telephone company drop wires and other equipment with subscriber wiring and equipment, and that define the boundary between the wiring and equipment for which the telephone company has responsibility, and that for which the subscriber is responsible.

BACKGROUND OF THE INVENTION

Prior to about 1985, network interface devices were usually located indoors, where their exposure to adverse environmental conditions and resulting corrosion or other damage was minimal. At the present time, however, the devices are typically mounted upon the outside walls of subscriber buildings. Even when located within enclosures, connector components of the devices are subject to damage caused by incursion of moisture, insects, debris, salt fog and the like, particularly if the components are not shielded from such matter by protective sealant material. Such damage impairs the performance and lessens the useful life of components of the assemblies. This is particularly true of the component of the RJ11 or other network interface device (NID) that separates the telephone company equipment from the subscriber's equipment.

Another deficiency of many of the existing NID is that the connections between the telephone company drop wires and the subscriber wires must be done by a person manually stripping and twisting the wires and then securing the same in place by nuts, washers and the like. The foregoing tedious procedure is rendered even more difficult when, as is frequently the case, the enclosure containing the network interface assemblies is so congested as to not permit ready access to the wires and terminals. When the network interface assembly includes a plurality of discrete units that are separately connected to each other and/or to the box within which they are housed, as is usually the case, identification and rectification of a malfunction may require testing of a number of the units, disconnection of the malfunctioning unit or units from the others and/or from the box, and replacement of them with new units. This also increases the time and expense of field servicing of the assemblies.

SUMMARY OF THE INVENTION

The present invention provides an improved network interface assembly that is free from most if not all of the deficiencies and shortcomings of the prior art devices. The assembly can be quickly and easily installed in protective enclosures of differing types without special tools or manual wire stripping or twisting. Functional modules upon the upper surface of the main body of the assembly have connectors that project to an underlying circuit means that extends along most of the length of the body of the assembly. A module adjacent one end of the assembly connects the telephone company drop wires to the assembly, and a module adjacent its opposite end connects the subscriber wires to the assembly. Intervening modules include one that at desired times provides an interface with an electronic circuit pack, and another that includes the jack of the NID. Each of the latter modules include shunt plugs that in conjunction with the circuit means provide shunt connection circuits across the modules at desired times. When the shunt plug of the module containing the NID is mated with the jack of the device it also protects the jack contacts. Removal of the plug permits a subscriber to work upon components of the assembly without being shocked and without transmitting a spark. Areas of the assembly within which conductors are located are factory prefilled with protective sealant material that prevents incursion of moisture, dirt, insects and the like, and permits flooding by water without service disruption. Compressive forces are imposed upon the sealant material in the module having the jack of the network interface device by piston elements of the shunt plug of the module and by air that is compressed in a blind chamber during insertion of the shunt plug into the jack. Test plugs may alternately be inserted into the jack for testing of the circuit back to the central office. Test plugs can be the standard plug normally attached to a telephone, or may be of a modified type having piston elements that engage sealant material in the module. When the test plug of the NID is not in the jack, the shunt plug is positioned to cover the open end of the jack and force gel from a surrounding chamber into encapsulating engagement with contacts of the shunt plug and of the jack. In conjunction with a circuit means of the assembly, the shunt plug also then provides a shunt connection across the jack.

The assembly preferably also includes an electronics interface module having a socket containing connector pins that extend to the circuit means of the assembly. When the module is not being used to provide an interface with an electronics unit, a shunt plug mateable with the pin connectors occupies the socket and, in conjunction with the circuit means, provides a shunt connection across the module.

DESCRIPTION OF THE PRIOR ART

The following U.S. Pat. Nos. may be of interest relative to the subject invention: 4,988,311, 4,910,770, 4,882,647, 4,825,466, 4,800,588, 4,796,150, 4,749,359, 4,741,032, 4,723,919, 4,647,725, 4,616,897, 4,588,238, 4,582,960, 4,562,311, 4,500,158, 4,488,008, 4,408,248, and Des. 318,653.

DESCRIPTION OF THE DRAWINGS

Other features of the invention will be apparent from the following description of illustrative embodiments thereof, which should be read in conjunction with the accompanying drawings, in which.

DESCRIPTION OF THE ILLUSTRATED EMBODIMENTS

Figure 1:
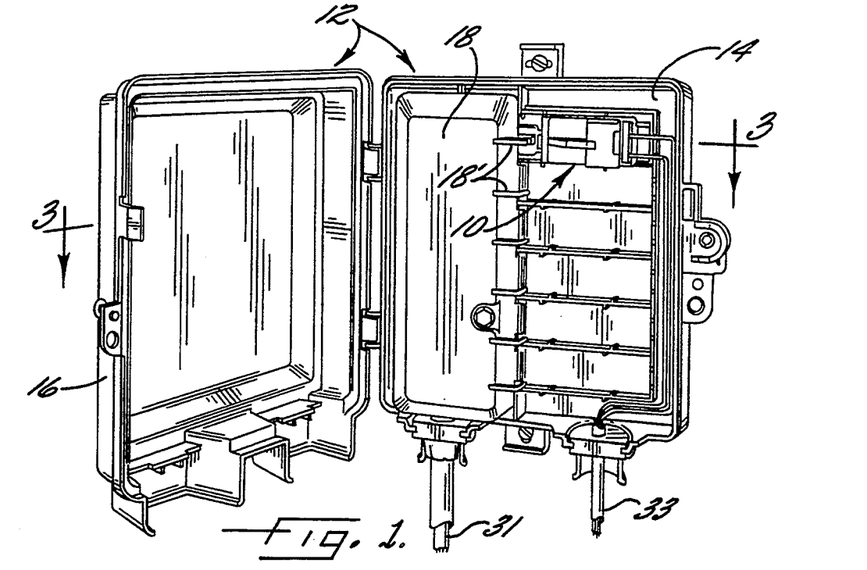
FIG. 1 is a front perspective view of a network interface assembly in accordance with the invention mounted in a housing of a first known type, an outer lid of the housing being shown in an open position, and an inner lid of the housing being shown in a closed position.
Figure 2:
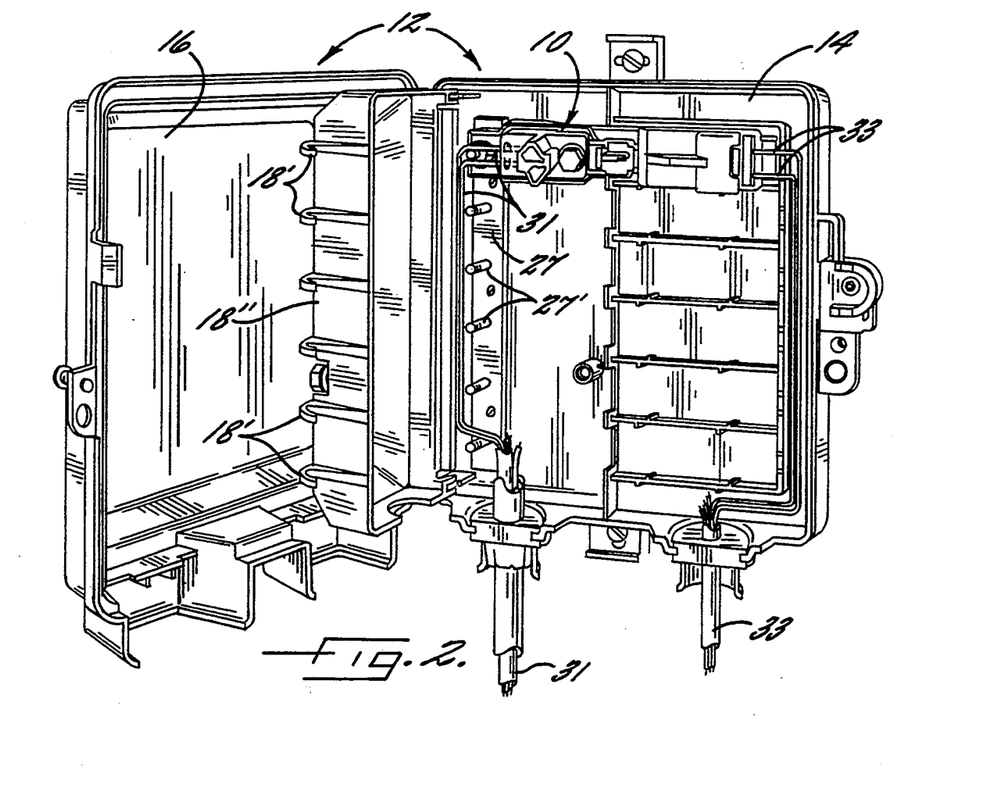
FIG. 2 is an enlarged view similar to FIG. 1 but showing the inner lid in an open position.
Figures 3, 4:
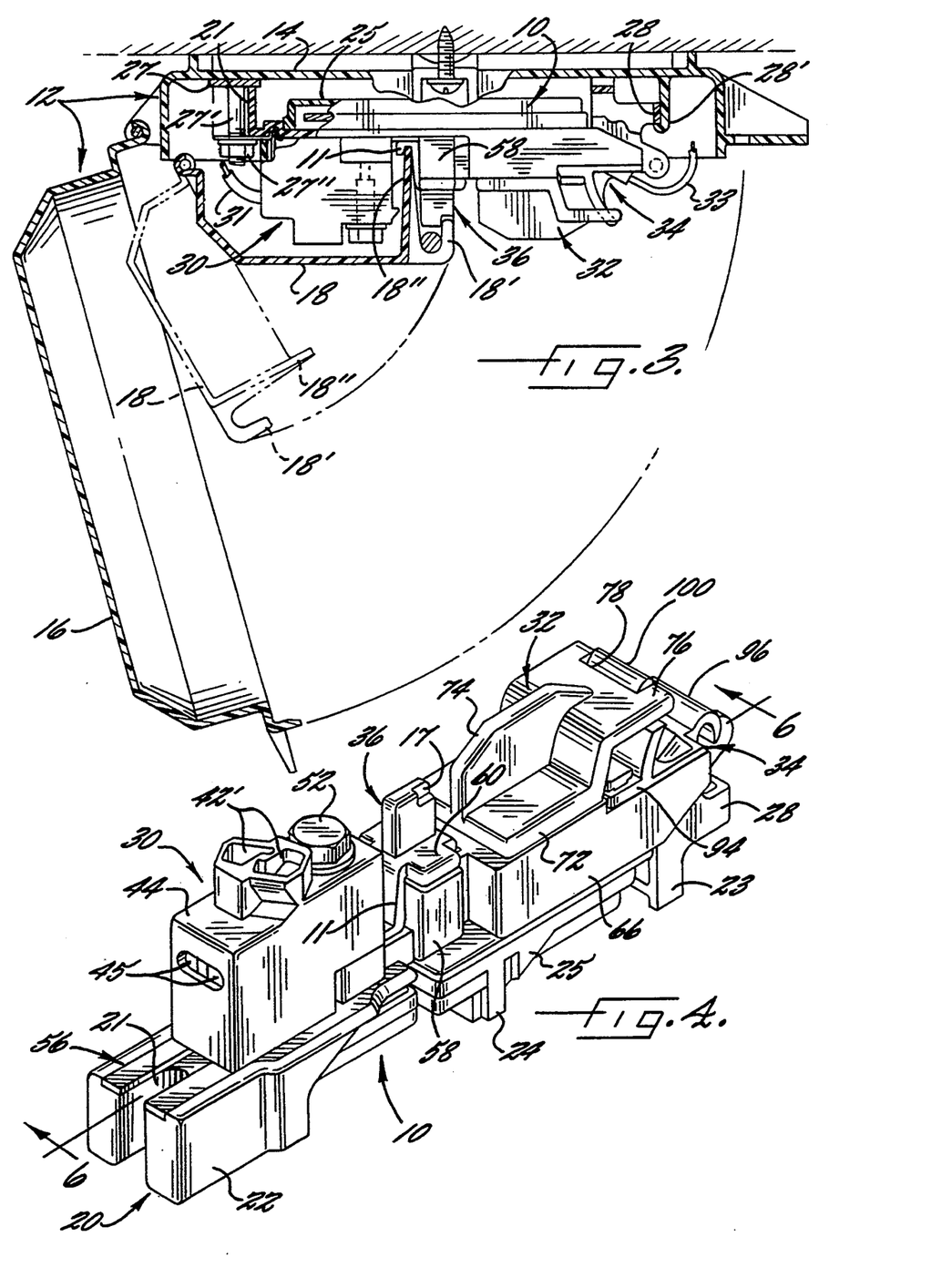
FIG. 3 is a view partially in section and partially in elevation taken substantially along the lines and in the direction of the arrows 3—3 of FIG. 1, wherein the outer lid of the housing is shown in a partially open condition, and the inner lid is shown by solid lines in a closed condition and by phantom lines in a partially open condition.
FIG. 4 is an enlarged perspective view of the interface assembly shown in FIGS. 1-3.

A network interface assembly 10 in accordance with the present invention is shown in FIGS. 1-3 within an enclosure 12 of a known type commonly used to mount network interface assemblies upon a pole or an outside wall of a home or other building of a subscriber of the telephone company. Enclosure 12 customarily and illustratively includes a base section 14 that is secured in a conventional manner to the subscriber's building, and to which network interface assembly 10 is affixed. Although only a single assembly 10 is shown in the illustrated enclosure 12 of FIGS. 1 and 2, the enclosure can accommodate up to six assemblies 10 in parallel side-by-side relationship. Enclosure 12 customarily and illustratively includes outer and inner lockable door members 16, 18 that pivot relative to base 14 between open and closed positions. A plurality of hook-shaped members 18' are located upon the door. The telephone company subscriber can gain access to subscriber components of assembly 10 by unlocking and opening outer door 16, but cannot gain access to the telephone company components of assembly 10 since these are overlaid by the inner door 18, that can only be unlocked by telephone company personnel. Enclosures that function in the aforesaid manner are well known to those skilled in the art, and that of FIGS. 1 and 2 is merely illustrative of enclosures within which assemblies 10 may be mounted.

Referring now more particularly to FIGS. 4-12 of the drawings, assembly 10 includes an elongate body 20 having legs 22, 23 adjacent opposite ends thereof, and another leg 24 that extends from the central portion of a circuit compartment 25 that underlies and is permanently secured to the bottom of body 20.

Figures 21, 22:
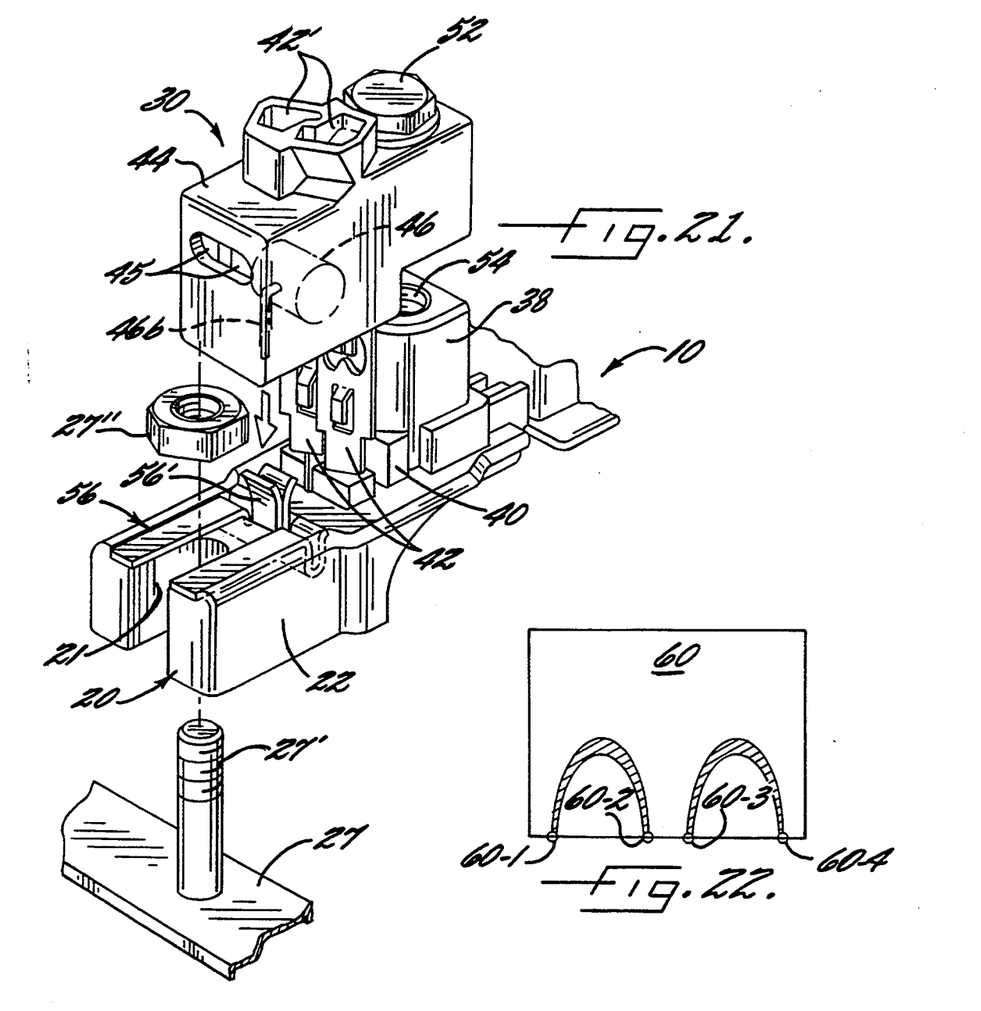
FIG. 21 is a fragmentary partially exploded perspective view of a bifurcated end portion of the assembly, and of adjacent connector and grounding elements.
FIG. 22 is a schematic diagram of a shunt plug of the assembly.

As is best shown in FIGS. 2 and 21, an opening 21 in the bifurcated end portion of body 20 adjacent leg 22 overlies a ground bus 27 of enclosure 12 and receives a threaded conductive stud 27' that extends upwardly from the bus. When a conductive nut 27" is threaded upon stud 27' and tightened, it secures the forked end portion of body 20 to enclosure section 14 and engages a conductive clip 56 upon the bifurcated end portion of body 20. The leg 23 adjacent the opposite end of body 20 includes a retainer bar 28 that is engaged by a flange of a retainer 28' (FIG. 3) that projects upwardly from the bottom wall of enclosure base section 14 and secures leg 23 to such section.

Circuit means, illustratively in the form of a printed circuit board 29, within compartment 25 is engaged by subsequently described signal conductor elements that extend downwardly from body 20 into and through board 29. Protective sealant material 19 within compartment 25 surrounds and protects board 29 and the adjacent portions of the conductor elements. Sealant 19 preferably is a gel, such as silicone, polyurethane, or thermoplastic elastomer, and usable as disclosed generally in U.S. Pat. Nos. 4,634,207 and/or 4,864,725, the disclosures of which are incorporated herein by reference. In lieu of and/or in addition to the circuit traces upon board 29, the circuit means might include wire conductors or plated circuit paths upon one or more interior surfaces of compartment 25 or upon the overlying bottom surface of assembly body 20. All non-metallic structural components of assembly 10 preferably are formed of moldable structural plastic material that has a high heat distortion temperature and has flame retardant properties.

A plurality of functional modules 30, 32, 34, 36 are spaced along the length of and extend upwardly from body 20 of assembly 10. Module 30 facilitates rapid protected connection of telephone company drop wires 31 (FIG. 6) to assembly 10. Module 34 facilitates rapid environmentally protected connection of subscriber wires 33 to assembly 10. Module 32 protects and provides a shunt path across a jack component 62 of the RJ11 (or other NID) of assembly 10. The module is also used to eliminate the possibility of a subscriber receiving an electrical shock, and/or sending a spark to the telephone company equipment, while wiring or otherwise accessing subscriber components of assembly 10. Module 36 permits assembly 10 to interface with electronic circuit packs, such as those employed for circuit testing or other purposes, and provides a shunt path across the module when it is not being used to interface with an electronics pack.

Figure 5:
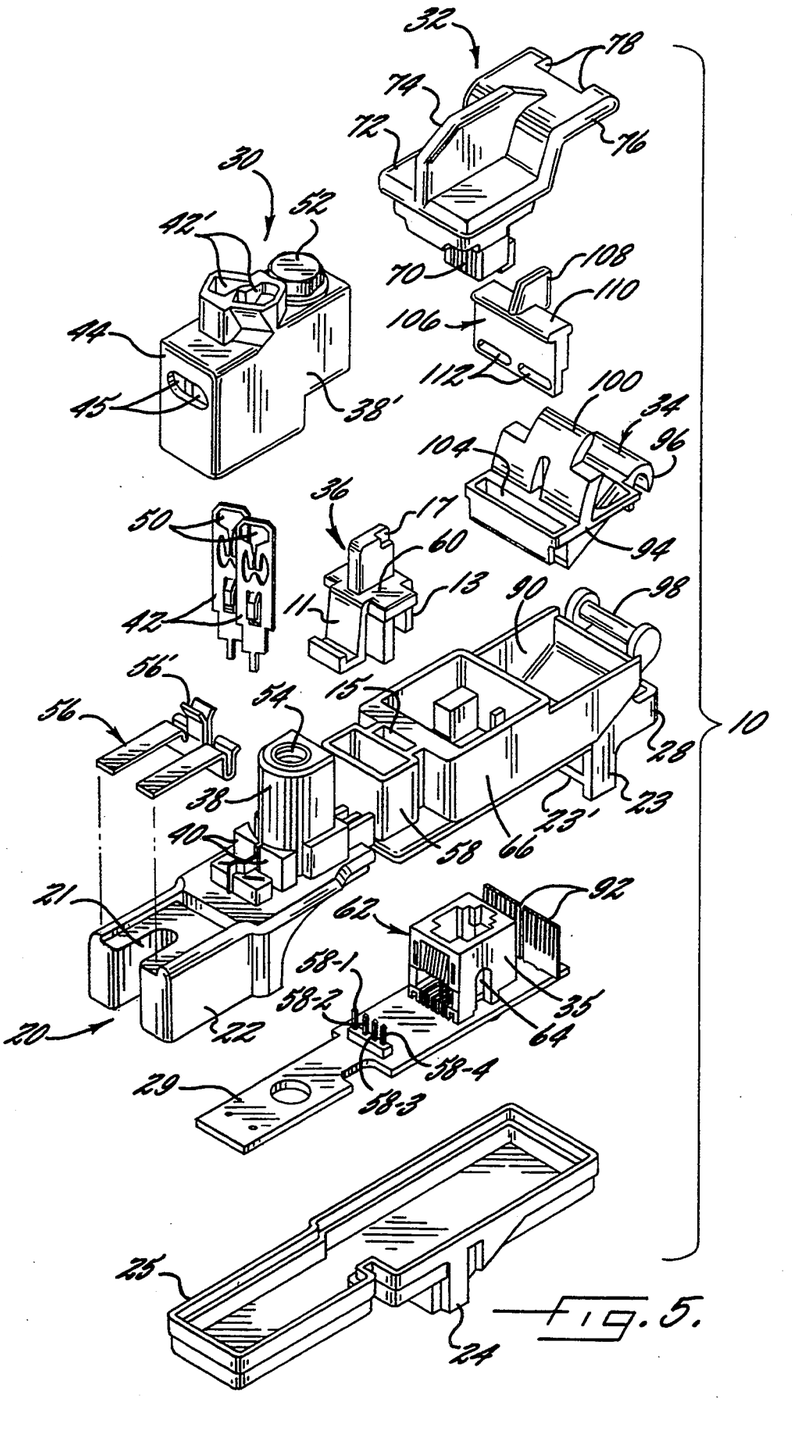
FIG. 5 is a partially exploded perspective view of components of the interface assembly of FIG. 4.
Figures 6, 7, 8:
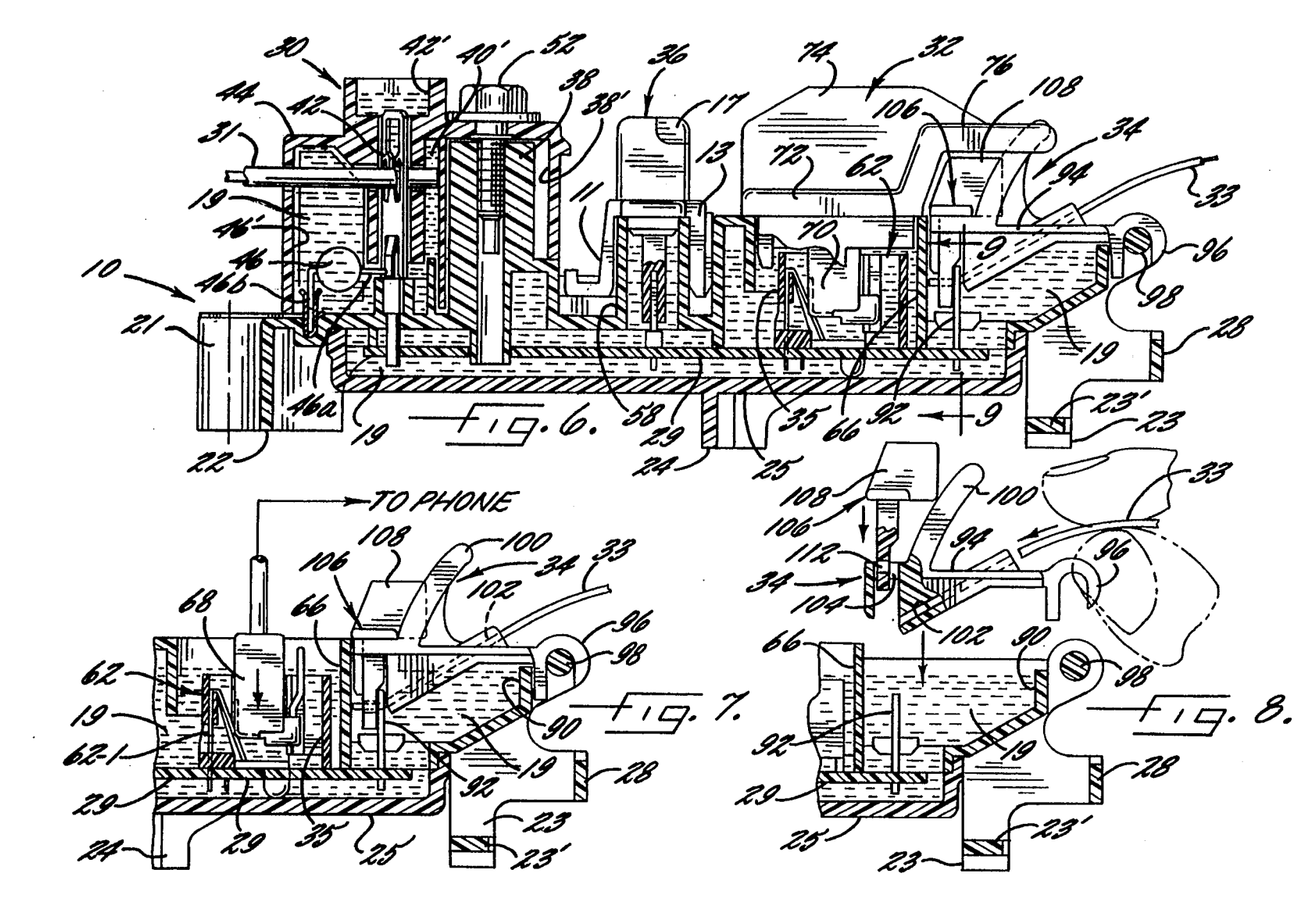
FIG. 6 is a vertical longitudinal sectional view of the assembly, parts of some of the components being shown in elevation.
FIG. 7 is a fragmentary sectional view of the NID and adjacent components shown in the righthand portion of FIG. 6, but wherein the jack contains a house plug instead of a shunt plug.
FIG. 8 is a fragmentary partially exploded sectional view of components shown in FIGS. 6 and 7 for connecting subscriber house wires to the interface assembly.
Figures 9, 10, 11, 12:
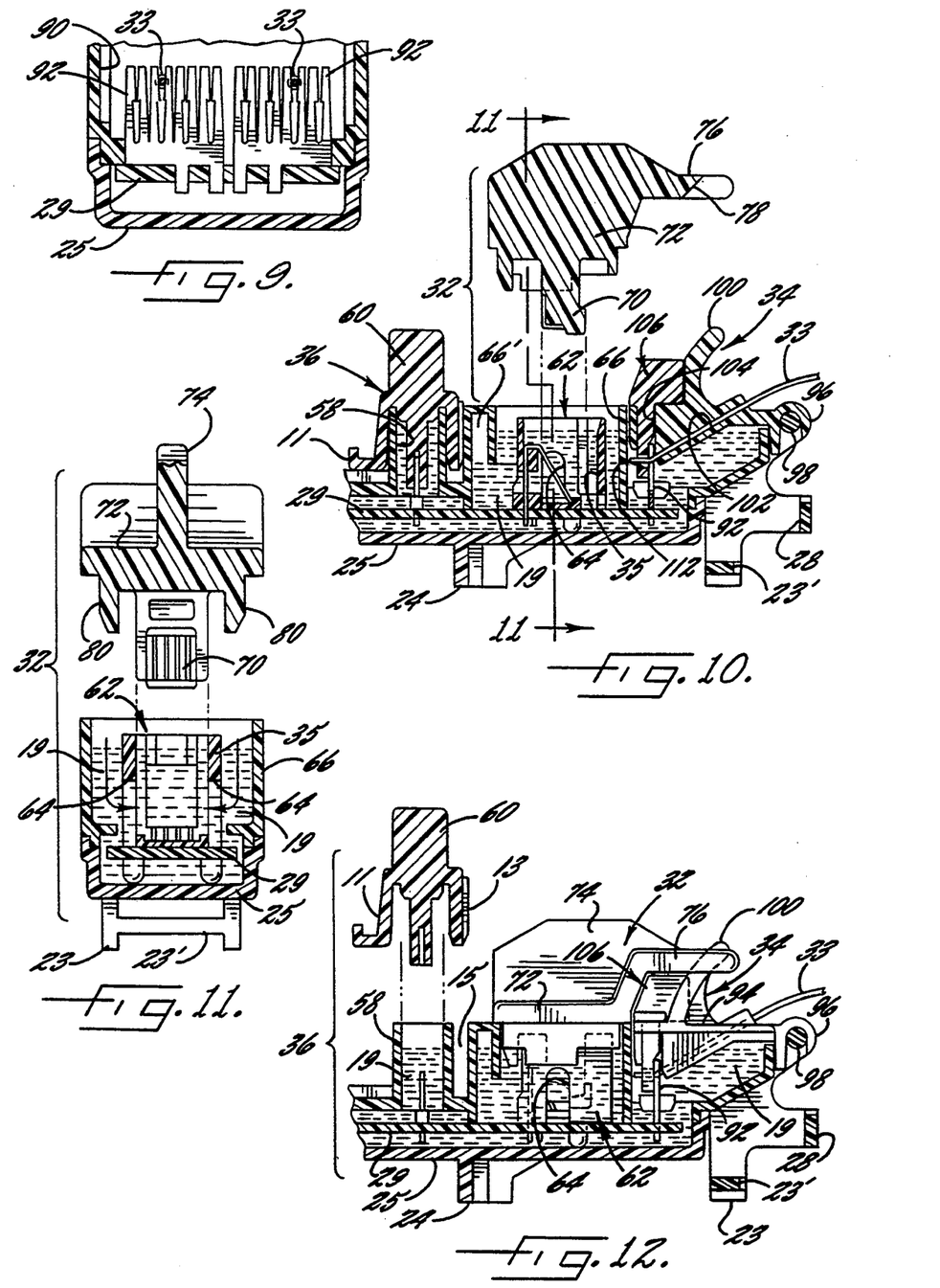
FIG. 9 is a view partially in transverse vertical section and partially in elevation of insulation displacing connectors and adjacent components of the interface assembly, as viewed in the direction of the arrows 9—9 of FIG. 6.
FIG. 10 is a view in vertical section of the jack and thereto adjacent components of the assembly shown in FIG. 6, but wherein the shunt plug is shown in section and in a vertically exploded position.
FIG. 11 is a view primarily in vertical section taken substantially along the line and in the direction of the arrows 11—11 of FIG. 10.
FIG. 12 is a view similar to FIG. 10, but showing the electronics interface shunt plug in an exploded position.

Referring now particularly to FIGS. 4–6 of the drawings, module 30 includes a guide post 38, piston elements 40 and insulation displacing connectors 42 that extend upwardly from body 20 of assembly 10. The module further includes a housing 44 having vertically extending chambers 38' and 42' that respectively receive post 38 and connectors 42; a sealant reservoir chamber 40' that receives piston elements 40; a chamber 46' containing a surge protection device 46 that protects the module from damage due to overvoltage and/or overcurrent conditions; and passageways 45 that receive drop wires 31 introduced into the housing and guide the wires into openings 50 that are present in connectors 42 beneath the closed upper edges of the connectors. The aforesaid chambers and passageways also contain protective sealant material 19.

Module 30 further includes a thread-forming screw 52 that extends through a rearward part of the upper wall of housing 44 and into a bore 54 that opens from the upper end of post 38. Rotation of screw 52 in the appropriate direction drives housing 44 downwardly from an upward inactive position to its position shown in FIG. 4 and wherein the housing abuts the upper surface of body 20. The aforesaid downward movement of housing 44 drives drop wires 31 downwardly into conductive engagement with connectors 42, the lower ends of which are in conductive engagement with the circuit means in compartment 25. Member 46 has tip and ring contacts 46a (one of which is shown in FIG. 6) that in the lower position of housing 44 engage connectors 42, and also has a third contact 46b (FIG. 21) that is received by a female connector 56' of a conductive clip 56 upon the bifurcated end portion of assembly 10. Downward movement of housing 44 also causes piston elements 40 to enter the lower end of sealant reservoir 40' of housing 44. This drives additional protective sealant material 19 from the reservoir into the chambers 42' that receive connectors 42, into the passageways 45 that receive drop wires 31, and into the housing area 46' containing surge protector 46, thereby eliminating or at least reducing the size of any voids that might be present in the sealant. Except for its not having any latch elements and having a somewhat different means for grounding surge protector 46, module 30 has substantially the same construction and function as the drop wire connector module disclosed in commonly assigned and co-pending U.S. patent application Ser. No. 07/776,501, filed Oct. 11, 1991 and entitled "Telecommunications Terminal Block" and the disclosure in such application of the module is incorporated herein by reference.

Figure 23:
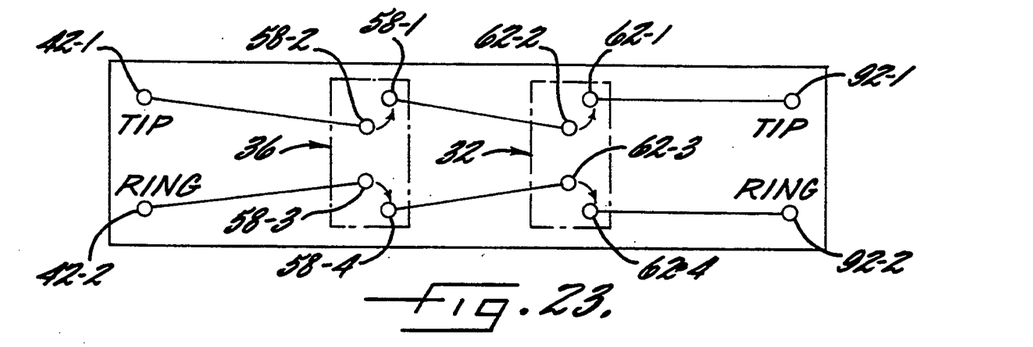
FIG. 23 is a schematic diagram of shunt connections of the assembly.

Electronic interface module 36 includes a jack 58 containing the upper end portions of pin type connectors 58-1, -2, -3, and -4 that extend upwardly from printed circuit board 29. When module 36 is not being used to interface to an electronic circuit pack, a shunt plug 60 (FIGS. 5 and 22) then positioned within jack 58 provides shunt connections (shown in the left part of FIG. 23 and also in FIG. 22) for conducting tip and ring signals from module 30 across module 36. Plug 60 includes interconnected tip-in and tip-out contacts 60-1, 60-2, and interconnected ring-in and ring-out contacts 60-3, 60-4. When jack 58 and shunt plug 60 are mated, jack contacts 58-2 and 58-4 engage respective plug contacts 60-2 and 60-4. This completes the shunt connection circuit across module 36. When module 36 is to be used to provide an interface with an electronics circuit pack (not shown), such as one for permitting remote circuit testing, plug 60 would be replaced by an active plug (not shown) connected to the electronics circuit pack.

Plug 60 has an L-shaped locking tab 11 extending downwardly and outwardly from one side thereof, a registration tab 13 extending downwardly into a recess 15 (FIG. 12) upon the opposite side thereof, and a notch 17 adjacent the upper end of the plug. When assembly 10 is mounted in the enclosure 12 of FIGS. 1 and 2 and inner enclosure door 18 is closed and locked, the lower end portion of tab 11 is overlaid by the free edge 18" of inner door 18, and a thereto adjacent one of the hook-shaped elements 18' upon door 18 overlies and engages the plug notch 17. This prevents subscriber access to assembly modules 30 and 36.

Module 32 includes the jack 62 of an RJ11 (or other NID) (FIG. 7). The jack has four laterally adjacent spring contacts 62-1 (62-2, 62-3, 62-4) and openings 64 within lower portions of its side and bottom walls. An open top enclosure 66 surrounds jack 62 and extends upwardly to an elevation above that of the jack. Sealant material 19 placed in jack 62 and enclosure 66 during manufacture of assembly 10 preferably does not extend above the upper surface of the jack. At those infrequent times when the NID jack 62 is being used for test purposes, it receives a conventional NID plug 68 (FIG. 7). At other times jack 62 receives a shunt plug 70 (FIG. 6) having interconnected tip-in and tip-out contacts 70-1 and 70-2, and interconnected ring-in and ring-out contacts 70-3 and 70-4. In conjunction with sealant material 19, shunt plug 70 then protects the four spring contacts 62-1, 62-2, 62-3 and 62-4 of jack 62 from moisture, dirt and other foreign matter. The plug then also provides, in conjunction with circuit means 29 and the contacts of jack 62, a shunt connection (FIG. 22) that conducts both tip and ring signals across the module. When plug 70 is removed from jack 62, no signal reaches module 34 and a subscriber can then perform wiring or other work at such module without risk of receiving shocks or of accidentally transmitting a damaging spark to telephone company equipment.

Plug 70 has an integral cover member 72 that overlies jack 62 and enclosure 66. A handle 74 extends upwardly from cover 72. A raised rearward part 76 of the cover has a notch 78 within its rear (rightward, as viewed in FIG. 5) edge. Piston elements 80 (FIG. 11) extend downwardly from side and front edge portions of cover 72. When cover 72 is placed upon enclosure 66 pistons 80 force additional sealant material 19 from enclosure 66 through the openings 64 in the walls of jack 62, and at the same time force sealant material further into a blind downwardly opening air chamber 66' (FIG. 10) within enclosure 66. This compresses the air (or other gas)within chamber 66'. The compressed air thereafter acts as a gas spring that maintains a compressive force upon the sealant 19 within enclosure 66, which in turn maintains engagement of the sealant with the contacts of the plug and jack and eliminates, or at least reduces the size of, any voids that might be in the sealant. Gas springs of the foregoing type may of course also be employed in other telecommunication enclosures, including but not limited to the housing 44 of module 30, containing protective sealant material that is at times compressed by plunger, piston or similar elements.

Module 34 includes an enclosure 90 filled with protective sealant material 19. A plurality (illustratively eight) of parallel insulation displacing connectors 92 extend upwardly from circuit means 29 into enclosure 90. A cover member 94 overlying enclosure 90 is pivotally connected by a female member 96 to a pivot shaft 98 adjacent the rear (rightward) end of enclosure 90. Cover 94 may be pivotally moved between its "closed" position of FIGS. 6 and 7 to a rearwardly disposed open position (not shown), by a person grasping and imparting counterclockwise movement to a handle 100 that projects upwardly from the cover and, in the closed position of the cover, is received within the notch 78 within the rear edge of cover 72 of shunt plug 70 of module 32, as shown in FIG. 4. An array of laterally adjacent passageways 102, which correspond in number to the number of insulation displacing connectors 92 and are longitudinally aligned with the open upper ends of respective ones of such connectors, extend angularly downwardly and forwardly through cover 94, and open from opposite front and rear surfaces of the cover. A slot 104, best shown in FIG. 5 and extending vertically through and laterally of a forward part of cover 94, receives a vertically movable wire remover member 106 having a handle 108 extending upwardly from an upper shoulder 110 of member 106. Slots 112 within the lower portion of member 106 are aligned with the forward ends of wire receiving passageways 102 when the components occupy their positions shown in FIGS. 6 and 7.

Connection of subscriber wires 33 to module 34 is initiated by inserting the wires into the rear ends of passageways 102 while cover 94 is pivoted rearwardly, and then moving the wires forwardly through the passageways of cover 94 until their leading ends abut the rear wall of enclosure 66. Cover 94 is then pivoted forwardly to its position of FIG. 6. Such pivotal movement drives wires 33 downwardly into the underlying insulation displacing connectors 92, and thereby establishes a conductive relationship between the wires and the connectors. If it should subsequently be desirable to remove one or more of the wires 33, this can be quickly and easily accomplished by firstly pivoting cover 94 rearwardly, then raising wire remover member 106 until the lower edges of its slots 112 drive the leading ends of wires 33 upwardly from connectors 92, and thereafter retracting the wires through passageways 102. The angular path of travel of wires 33 during insertion and/or removal thereof causes only minimal disturbance of the protective sealant material 19 in enclosure 90, which contributes to the long useful life of the module. As previously noted, insertion and/or removal of wires 33 can be accomplished by a subscriber without fear of his receiving electrical shocks, or generating sparks, when no plug occupies jack 62 of module 32.

Figures 15, 16, 17, 18, 19, 20:
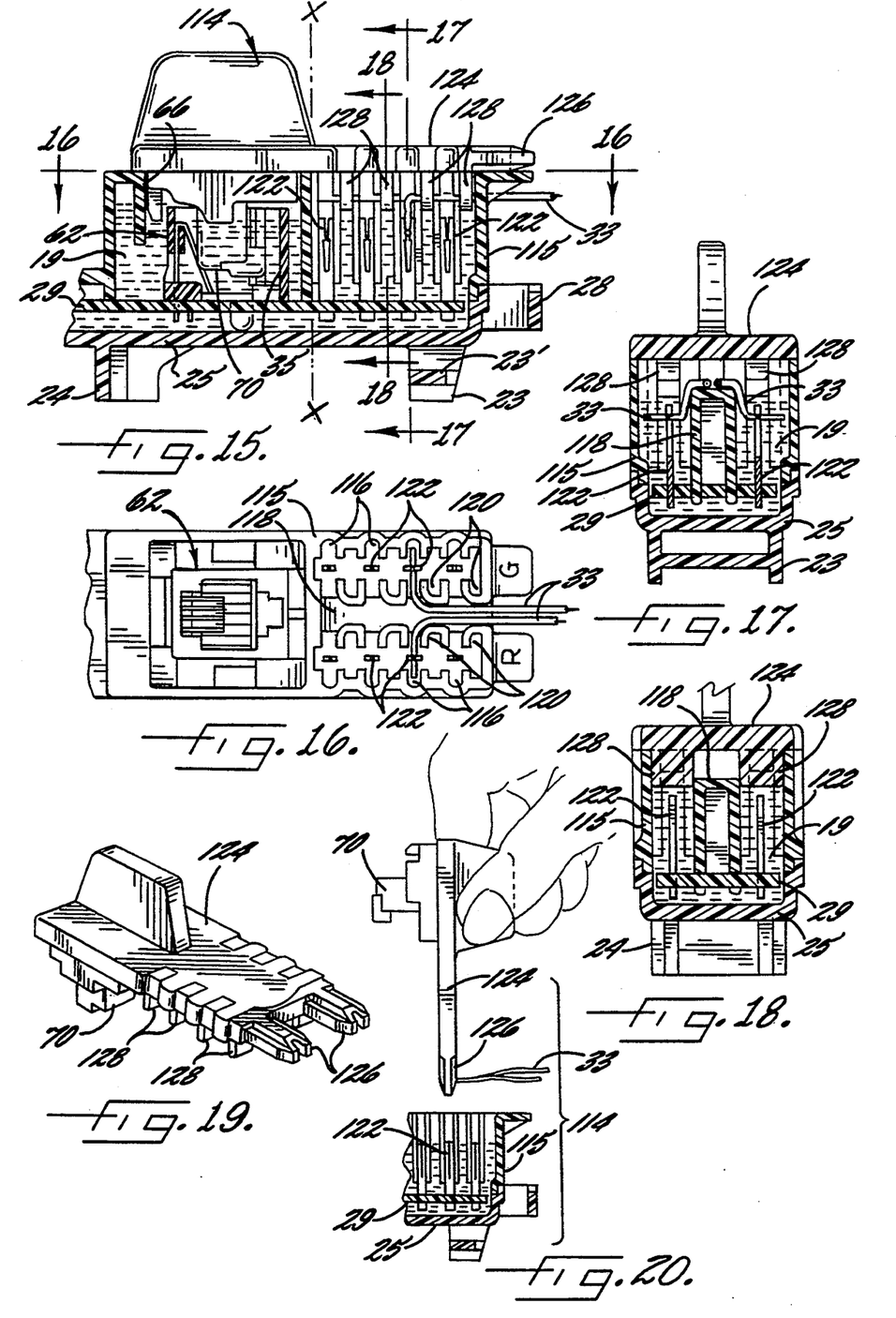
FIG. 15 is an enlarged fragmentary sectional view of an alternative embodiment of the module for connecting the subscriber house wires to the interface assembly, wherein a handle of a cover component is shown in side elevation.
FIG. 16 is a top plan view taken in the direction of the arrows 16—16 of the module shown in FIG. 15 with the cover component thereof removed.
FIG. 17 is a vertical section through the module taken substantially along the line and in the direction of the arrows 17—17 of FIG. 15, and also showing a pair of subscriber wires.
FIG. 18 is a sectional view taken substantially along the lines and in the direction of the arrows 18—18 through the module of FIG. 15.
FIG. 19 is a top side perspective view of the combination cover and wire insertion tool of the FIG. 15 module.
FIG. 20 is a side elevational and sectional view illustrating one way of effecting insertion of wires into the FIG. 15 module.

FIGS. 15–20 show another embodiment of a module 114 for connecting subscriber wires 33 to assembly 10. The components of module 114 that are located to the left of the line X—X and below line 16—16 of FIG. 15 have substantially the structure and function as the corresponding previously described components of module 32, and therefore will not be redescribed. An enclosure 115 of module 114 has inwardly opening and vertically extending grooves 116 integral with its opposite side walls. A centrally located and rearwardly and upwardly opening passageway 118 extends longitudinally of the enclosure. Generally U-shaped grooves 120 adjacent opposite sides of passageway 118 confront grooves 116. A plurality (illustratively eight) of insulation displacing connectors 122 extend upwardly from circuit compartment 25 into the spaces within enclosure 115 between the outer walls of the enclosure and passageway 118. The rearward (rightward, as viewed in FIG. 15) section of cover 124 of module 114 has first and second rows of sealant plunger elements 128 that depend downwardly from respective first and second side edge portions of the cover, and also has a pair of bifurcated wire driver elements 126 that extend from the rear (right, as viewed in FIGS. 15, 16 and 19) end of cover 124. Connection of subscriber wires 33 to connectors 122 may be effected, as shown in FIG. 20, by inserting the wires into the passageway 118 to the desired extent, positioning the leading end sections of the wires over thereto adjacent ones of the connectors upon opposite sides of passageway 118, and then driving the wires into the connectors by use of the bifurcated elements 126 of cover 124. Alternatively, the wires 33 (see FIG. 20) may firstly be inserted into elements 126, and then driven by downward movement of the vertically oriented cover 124 into connectors 122. In either case the interconnections between wires 33 and connectors 122 are quickly and easily effected without the wires 33 of any assembly 10 crossing over the wires of any other assembly.

Figure 13:
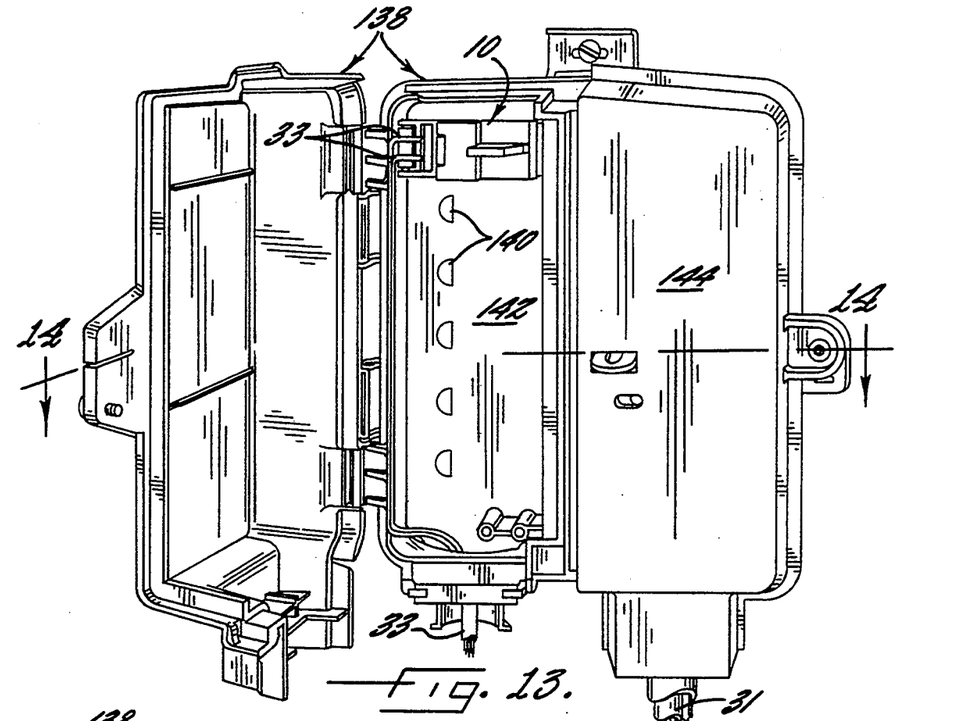
FIG. 13 is a perspective view of the network interface assembly mounted in a housing of a second known type, an outer access lid of the housing being shown in an open condition, and an inner lid of the housing being shown in a closed position.
Figure 14:
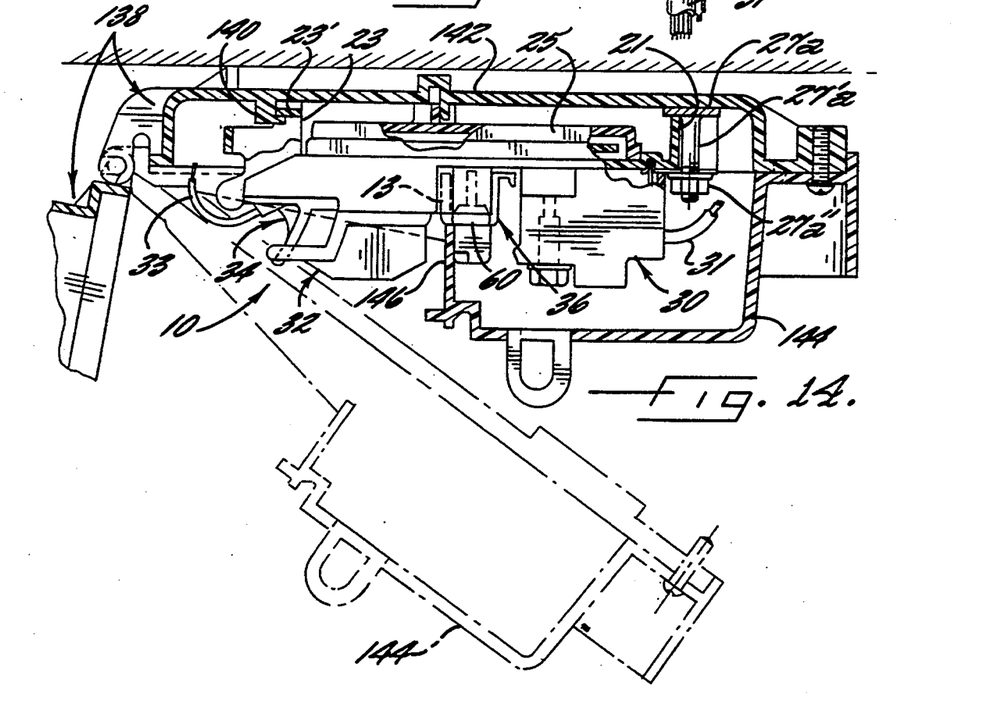
FIG. 14 is a fragmentary sectional view taken substantially along the line and in the direction of the arrows 14—14 through the housing of FIG. 13, and showing the inner lid in phantom lines in a partially open position.

FIGS. 13 and 14 show an assembly 10 mounted in an enclosure 138 of a second known type. In order that the retainer 23' of assembly 10 might be overlaid by one of the existing retainer tabs 140 upon base section 142 of enclosure 138, assembly 10 is displaced 180− from its orientation within the enclosure 12 of FIGS. 1 and 2. The components for securing the bifurcated end portion of the assembly to a ground bus 27a of enclosure 138 are the same as those of the enclosure 12 of FIGS. 1 and 2, and are identified by the same reference characters with the addition of an "a" suffix. When inner door 144 of enclosure 138 is closed and locked by the telephone company a flange 146 upon the inner door closely overlies the tab 13 of plug 60 so as to prevent subscriber access to the telephone company components of assembly 10, while allowing subscriber access to subscriber modules 32, 34.

While specific embodiments of the invention have been shown and described, this was for purposes of illustration only, and not for purposes of limitation, the scope of the invention being in accordance with the following claims.

We claim:

1. A telecommunications network interface assembly, comprising:
   a main body having a circuit chamber;
   circuit means and protective sealant material within said circuit chamber;
   a plurality of modules connected to said main body, said modules including a network interface module including a jack and a shunt plug mateable with said jack;
   said shunt plug when mated with said jack transmitting signals across said module, removal of said shunt plug from said jack interrupting signal transmission across said module;
   said modules including at least one other module from the group consisting of a drop wire module for connecting telephone company drop wires to said assembly, an electronics interface module, and a subscriber wire module for connecting subscriber wires to said assembly.

2. An assembly as in claim 1, wherein said jack has walls having openings extending therethrough.

3. An assembly as in claim 2, and further including protective sealant material within said jack.

4. An assembly as in claim 3, wherein said sealant material within said jack is spaced below the upper surface of said jack.

5. An assembly as in claim 3, wherein said sealant material is a gel.

6. An assembly as in claim 1, and further including an enclosure about said jack.

7. An assembly as in claim 6, and further including protective sealant material within said enclosure.

8. An assembly as in claim 7, and further including a chamber containing compressed gas and communicating with said enclosure.

9. An assembly as in claim 8, wherein said chamber is located within said enclosure.

10. An assembly as in claim 7, wherein said shunt plug has piston elements that engage said sealant material within said enclosure when said shunt plug is mated with said jack.

11. An assembly as in claim 10, wherein said shunt plug has a cover element overlying said enclosure and said jack when said shunt plug is mated with said jack, said piston elements extending downwardly from the undersurface of said cover of said shunt plug.

12. An assembly as in claim 1, wherein sections of said circuit chamber are integral with said main body.

13. An assembly as in claim 1, wherein sections of said network interface module are integral with said main body.

14. An assembly as in claim 1, wherein sections of said one other module are integral with said main body.

15. An assembly as in claim 1, wherein said other module is a drop wire module.

16. An assembly as in claim 15, wherein said drop wire module includes insulating displacing drop wire connectors connected to said circuit means.

17. An assembly as in claim 16, wherein said insulation displacing connectors each have a closed upper end and a drop wire entrance opening below said upper end.

18. An assembly as in claim 15, wherein sections of said drop wire module are integral with said main body.

19. An assembly as in claim 16, wherein said drop wire module includes a housing movable from an elevated position to a lowered position.

20. An assembly as in claim 19, and further including means for driving said housing from said elevated position to said lowered position.

21. An assembly as in claim 19, wherein said housing includes a sealant reservoir chamber.

22. An assembly as in claim 21, wherein said drop wire module further includes piston elements that enter said housing upon movement of said housing to said lower position thereof.

23. An assembly as in claim 19, and further including a surge protector device within said housing.

24. An assembly as in claim 19, and further including protective sealant material within said housing.

25. An assembly as in claim 24, wherein said sealant material is a gel.

26. An assembly as in claim 1, wherein said other module is said electronics interface module.

27. Pun assembly as in claim 26, wherein said electronics interface module includes an electronic interface jack and connectors extending from said jack to said circuit means;
   shunt plug means mateable with said jack of said electronic interface module for, when so mated, transmitting signals across said module;
   removal of said shunt plug from said electronic interface jack interrupting transmission of said signals across said network interface module.

28. An assembly as in claim 27, and further including locking and registration elements connected to said shunt plug of said electronic interface module.

29. An assembly as in claim 27, wherein sections of said electronic interface module are integral with said main body of said assembly.

30. An assembly as in claim 1, wherein said other module is said subscriber wire module.

31. An assembly as in claim 30, wherein said subscriber wire module includes an enclosure, and connector elements disposed within said enclosure and extending to said circuit means.

32. An assembly as in claim 31, wherein said connector elements are insulation displacing connector elements.

33. An assembly as in claim 32, wherein said connector elements are in laterally adjacent relationship to each other.

34. An assembly as in claim 31, wherein said subscriber wire module includes a cover member overlying said enclosure and movable between an open position and a closed position.

35. An assembly as in claim 34, wherein said subscriber wire module further includes means mounting said cover member for pivotal movement between said open position and said closed position.

36. An assembly as in claim 34, wherein said cover member of said subscriber wire module has a plurality of subscriber wire passageways extending through said cover member.

37. An assembly as in claim 36, wherein said passageways extend angularly downwardly and forwardly when said cover member is in said closed position thereof.

38. An assembly as in claim 36, wherein said passageways are generally aligned with upper end sections of respective ones of said connectors in said enclosure when said cover member is closed.

39. An assembly as in claim 1, wherein said other module is said subscriber wire module and said subscriber wire module includes an enclosure adjacent an end of said module, connector elements extending between said enclosure and said circuit means and a subscriber wire passageway extending through said enclosure and opening from an end thereof.

40. An assembly as in claim 39, wherein said passageway of said subscriber wire module is substantially equidistant from opposite sides of said enclosure.

41. An assembly as in claim 39, wherein said passageway of said subscriber wire module is spaced below the upper surface of said enclosure.

42. An assembly as in claim 39, wherein said connector elements are insulation displacing connectors.

43. An assembly as in claim 39, wherein said connector elements of said subscriber wire module include at least a first connector element adjacent a first side of said passageway and a second connector element adjacent a second, opposite side of said passageway.

44. An assembly as in claim 39, wherein said subscriber wire module further includes a plurality of generally U-shaped upwardly opening members within said enclosure.

45. An assembly as in claim 44, wherein said subscriber wire module further includes a cover member overlying said enclosure.

46. An assembly as in claim 45, wherein said cover member has at least one sealant plunger element projecting from said cover member into said enclosure.

47. An assembly as in claim 46, wherein said sealant plunger element is received within confronting ones of said U-shaped members.

48. An assembly as in claim 45, and further including subscriber wire gripping means upon said cover member for establishing contact between said subscriber wires and said insulation displacing connectors.

49. An assembly as in claim 48, wherein said subscriber wire gripping means includes at least one bifurcated gripping element carrier by and projecting from said cover member.

50. An assembly as in claim 39, and further including protective sealant material within said enclosure.

51. An assembly as in claim 50, wherein said protective sealant material is a gel.

52. An assembly as in claim 39, wherein sections of said subscriber wire module are integral with sections of said main body of said assembly.

53. A telecommunications connector assembly, comprising:
an enclosure;
at least one conductive member in said enclosure;
protective sealant material in said enclosure;
a chamber communicating with said enclosure and containing a compressed gas imposing a compressive force upon said sealant material; and at least one plunger member moveable into said enclosure, movement of said plunger member into said enclosure compressing said sealant material and said gas.

54. A telecommunications connector assembly as in claim 53, wherein said compressed gas is air.

55. A telecommunications connector assembly as in claim 53, wherein said chamber is within said enclosure.

56. A telecommunications connector assembly as in claim 53, and further including at least one plunger member moveable into said enclosure, movement of said plunger member into said enclosure compressing said sealant material and said gas.

57. A telecommunications connector assembly as in claim 53, and further including a removable cover for said enclosure, said plunger member being attached to said cover member.

58. In a telecommunications assembly having means for connecting subscriber wires to said assembly, the improvement comprising:
an enclosure having an end wall;
a subscriber wire passageway extending through said enclosure and through said end wall, and
connector members within said enclosure upon opposite sides of said passageway for connecting such subscriber wires to said assembly.

59. An assembly as in claim 58, wherein said connector members are insulation displacing connectors.

60. An assembly as in claim 59, and further including protective sealant material within said enclosure.

61. An assembly as in claim 60, wherein said sealant material is a gel.

62. An assembly as in claim 61, and further including a removable cover member overlying said enclosure, and a plurality of sealant plunger members carried by said cover member and extending into said enclosure.

63. An assembly as in claim 62, wherein said enclosure includes a plurality of generally U-shaped members receiving said plunger members.

64. An assembly as in claim 61, and further including at least one subscriber wire gripping member carried by said cover member.

65. An assembly as in claim 64, wherein said wire gripping member is of bifurcate construction.

66. An assembly as in claim 65, wherein said wire gripping member extends from a rear end of said cover member.

67. A telecommunications connector assembly as in claim 66, and further including a second bifurcated wire gripping member extending from said cover member.

68. A telecommunications connector member as in claim 67, wherein said bifurcated wire gripping members are substantially parallel.

69. A telecommunications network interface assembly, comprising:
a main body having a bifurcated end, and grounding means for establishing a ground connection with said body;
said grounding means including a ground buss underlying said bifurcated end of said main body, a ground clip upon said bifurcated end of said main body, and a conductive post connected to said ground buss and extending upwardly therefrom through said bifurcated end of said main body.

70. A telecommunications network assembly as in claim 69, and further including a conductive member upon said post engaging said clip.

71. An assembly as in claim 1, wherein said modules include said electronics interface module, and further including an enclosure of a first type and an enclosure of a second type for receiving said assembly, each of said enclosures including an inner door having a flange, said flange being closely adjacent said shunt plug of said electronics interface module when said door is closed.

72. An assembly as in claim 71, and further including first and second tab elements connected to said shunt plug of said fourth module, one of said tab elements being closely overlaid by said flange of said inner door of said enclosure of said first type when said door is closed, and the other of said tab elements being closely overlaid by said flange of said door of said second enclosure of said second type when said door thereof is closed.

73. An assembly as in claim 72, wherein said tab elements are located upon opposite sides of said shunt plug.

74. An assembly as in claim 73, wherein the orientation of said assembly when in one of said enclosures is displaced about 180− from the orientation thereof when in the other of said enclosures.

* * * * *